United States Patent
Sanoner et al.

(10) Patent No.: US 7,256,587 B2
(45) Date of Patent: *Aug. 14, 2007

(54) MULTIPLE SENSITIVITY STUD SENSING DEVICE

(75) Inventors: Hughes Sanoner, Tsuen Wan (HK); Desmond Wai Nang Tse, Tsuen Wan (HK); Ronald Tak Yan Yim, Tsuen Wan (HK)

(73) Assignee: Solar Wide Industrial Limited, Tsuen Wan, New Territories (HK)

( * ) Notice: Subject to any disclaimer, the term of this patent is extended or adjusted under 35 U.S.C. 154(b) by 340 days.

This patent is subject to a terminal disclaimer.

(21) Appl. No.: 10/986,439

(22) Filed: Nov. 12, 2004

(65) Prior Publication Data

US 2005/0138886 A1    Jun. 30, 2005

Related U.S. Application Data

(63) Continuation-in-part of application No. 10/462,832, filed on Jun. 17, 2003, now Pat. No. 6,894,508.

(60) Provisional application No. 60/519,328, filed on Nov. 13, 2003, provisional application No. 60/391,964, filed on Jun. 28, 2002.

(51) Int. Cl.
*G01R 27/26* (2006.01)
(52) U.S. Cl. .................... 324/662; 324/663
(58) Field of Classification Search ............ 324/662, 324/663
See application file for complete search history.

(56) References Cited

U.S. PATENT DOCUMENTS 3,226,496 A * 12/1965 Seabury, Jr. ............ 200/11 K
4,464,622 A    8/1984 Franklin
5,296,807 A *  3/1994 Kousek et al. .......... 324/235
5,352,974 A   10/1994 Heger
5,512,834 A    4/1996 McEwan
5,619,128 A    4/1997 Heger
6,215,293 B1   4/2001 Yim
6,249,113 B1   6/2001 Krantz et al.
6,259,241 B1   7/2001 Krantz
6,456,053 B1   9/2002 Rowley
6,894,508 B2 * 5/2005 Sanoner et al. ......... 324/662

* cited by examiner

*Primary Examiner*—Anjan Deb
*Assistant Examiner*—Amy He
(74) *Attorney, Agent, or Firm*—Leydig, Voit & Mayer, Ltd.

(57) ABSTRACT

A multiple sensitivity stud sensing device for determining a location of objects behind a wall lining has a housing with a surface for moving over the wall lining. Within the housing are a capacitive sensor with first and second capacitances provided adjacent the surface and control circuitry. The control circuitry includes a detecting circuit connected to the sensor for providing a detection signal related to an imbalance between the first and second capacitances, a comparator having a reference signal for providing a comparator signal related to a difference between the detection signal and the reference signal, and a controller for receiving the comparator signal and providing a display signal. A display is provided on the housing for indicating a location of an object behind the wall lining. An input device is provided on the housing so that a user of the device can select a value for the reference signal.

7 Claims, 4 Drawing Sheets

MULTIPLE SENSITIVITY STUD SENSING DEVICE

BACKGROUND OF THE INVENTION

1. Field of the Invention

The invention relates to a stud sensing device for detecting objects behind wall linings.

2. Description of Prior Art

Stud detectors are well known and rely on detecting changes in dielectric constant. A portable stud locating device is fully described in U.S. Pat. No. 4,464,622. But the device ignores the effect of wall lining thickness on the accuracy of locating stud edges, and provides no compensation for it.

U.S. Pat. No. 5,352,974 discloses a stud sensor of dual sensitivity. However, experiments show that dual sensitivity is not adequate to accommodate operation of a stud sensor upon walls, which are practically available, of varied thickness ranging from ½ to 2 inches.

U.S. Pat. No. 6,215,293 discloses a stud sensing device comprising a routine of searching for studs for 5 seconds after self-calibration of the device. If no (wood) studs are detected during the 5-second period, the wood stud detection circuit is disabled. This functions as a means to determine the presence of studs behind walls. However, it does not provide a compensating means to eliminate the effect of wall thickness on the accuracy of locating studs.

As different wall thickness affects the accuracy of locating stud edges, a stud sensor with fixed or pre-assigned sensitivity may not be able to locate stud edges accurately enough.

SUMMARY OF THE INVENTION

It is an object of the invention to provide a stud sensing device for sensing studs through wall linings of different thickness. It is another object of the invention to provide a stud sensing device that operations under different ambiences with flexibility and user-defined sensitivity, as studs of different width or density and humidity could have an effect on detection accuracy. Yet another object of the invention to provide a method for determining wall lining thickness and automatically compensating for its effect on locating studs.

According to a first aspect of the invention there is provided apparatus for detecting objects behind a wall lining including an input device for allowing a user to select of multiple sensitivities for the apparatus. Preferably the input device allows the user to selects one of a plurality of sensitivities. Preferably, although not exclusively, the sensitivities are related to a wall lining thickness. Preferably the apparatus also includes a display for showing the sensitivity.

In one embodiment the input device is a slide switch. In another embodiment the input device is a push button switch.

According to a second aspect of the invention there is provided an apparatus for detecting objects behind a wall lining including an input device for allowing a user to select a sensitivity for the apparatus from within a continuous sensitivity range. In a third embodiment the input device is a continuous adjustor, such as a linear or rotary potentiometer (variable resistor) or the like.

According to a third aspect of the invention there is provided an apparatus for detecting objects behind a wall lining including an automatic sensitivity adjustment process for detecting and compensating for the effect of wall lining thickness. Preferably the process includes defining a relationship between a wall lining thickness and a detection circuit parameter. Preferably the detection circuit parameter is voltage.

Further aspects of the invention will become apparent from the following description and drawings, which are given by way of example only to illustrate the invention.

BRIEF DESCRIPTION OF THE DRAWINGS

Embodiments of the invention will now be described with reference to the accompanying drawings in which.

DESCRIPTION OF THE PREFERRED EXAMPLES

Figure 1:
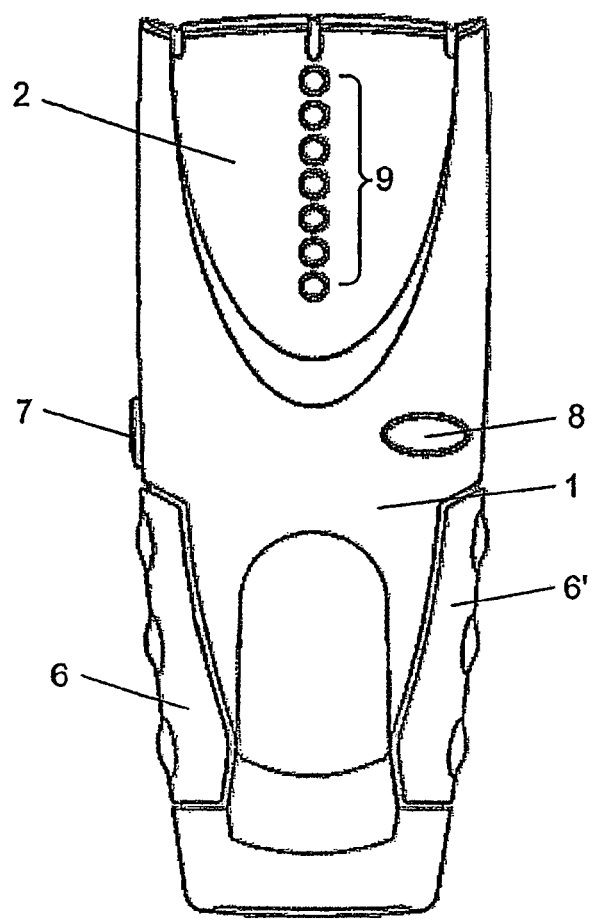
FIG. 1 illustrates a front view of a multiple sensitivity stud sensing device according to the invention.
Figure 2:
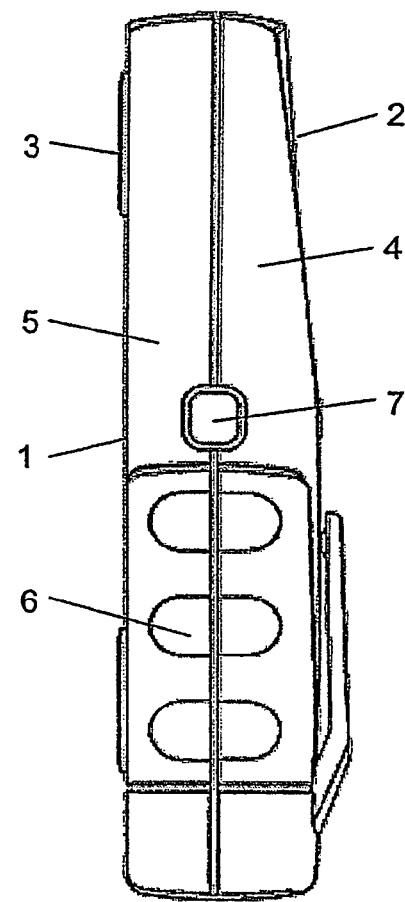
FIG. 2 illustrates a side view of the device.

In FIGS. 1 and 2 there is depicted a multiple-sensitivity stud sensor device for detecting objects behind a wall lining. The device includes a housing 1 formed from front and rear housing elements 4, 5 that clip or secure together at an equator to enclose operating circuitry. The front element 4 includes a display area 2 and the back element 5 includes a detection face 3 that is placed against a wall lining. The housing 1 also includes a grip portion 6. Proximate the grip portion 6 is an on-off push button switch 7 and a sensitivity selection push button switch 8.

On display 2, are seven indicator LEDs 9 for indicating a location of an object behind a wall lining. In operation the device is moved slowly over a wall lining. A first indicator LED 9 illuminates to indicate the presence of an object behind the wall lining. As the distance between the object and the device decreases, i.e. the device moves closer to the object, further indicator LEDs 9 illuminate progressively. All seven indicator LEDs 9 illuminate and a buzzer 26 is turned on when the device moves over a first edge of the object behind the wall lining.

Figure 3:
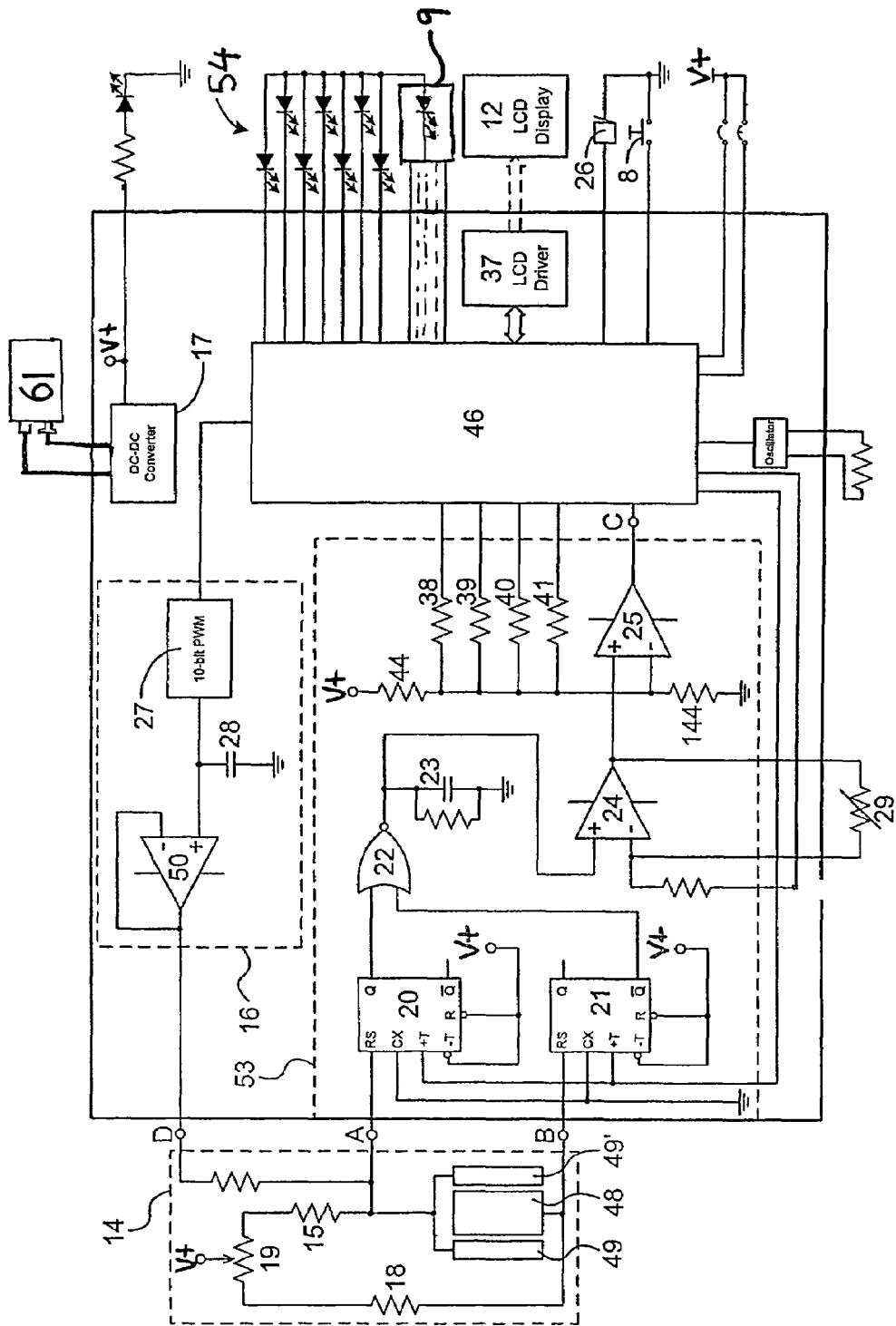
FIG. 3 is circuit diagram for the device.

FIG. 3 is a circuit diagram of the electronics of the device. The circuit includes a micro-controller 46, a detector circuit 53, sensing element 14, and a calibration circuit 16. A converter 17 provides a circuit voltage from a portable power source such as a battery 61. The detector circuit 53, sensing element 14, and a calibration circuit 16 are the same as those in applicants earlier U.S. patent application Ser. No. 10/462,832 titled Apparatus and Method for Locating Objects Behind a Wall Lining, the contents of which is incorporated herein by reference.

The sensor element 14 comprises capacitor plates 48, 49 and 49', and resistors 15 and 18 forming two resistor-capacitor (RC) circuits connected at nodes A and B. One RC circuit comprises capacitor plate 48 and resistor 18 and the other comprises capacitor plates 49 and 49' and resistor 15. Variable resistor 19 is used to balance the RC circuits during factory calibration.

At power-up calibration circuit 16 applies a DC bias voltage to input node D of the RC circuits of sensor element 14. The calibration circuit 16 comprises a PWM module 27 and a capacitor 28 connected to the PWM module 27 output. The capacitor 28 acts as an integrator by smoothing, or averaging, the output pulses of the PWM module 27. To increase the DC bias level the duty cycle of PWM module 27 is increased. To reduce the DC bias the duty cycle of PWM module 27 is decreased. The DC bias is applied through a voltage follower 50. Because the input impedance of the voltage follower 50 is very high it isolates the sensing element 14 from the PWM module 27 and capacitor 28 avoiding a "loading" effect, which might affect the DC bias voltage level. The voltage follower 50 is not essential and the integrated output of PWM module 27 can be applied directly to the sensing element 14.

As the device is moved across the wall surface the presence of an object, such as a wall stud, behind the wall lining changes the stray capacitance of capacitor plates 48, 49 and 49' resulting in a variation of RC times at the two sensor nodes A and B. Nodes A and B are connected to respective inputs of two monostable vibrators 20, 21 of detector circuit 53. The monostable vibrators 20, 21 are triggered by the controller 46 and their respective outputs change state for a length of time determined by the time constant of the RC circuit at the respective input. The monostable vibrators 20, 21 convert the two RC time constants of the RC circuits into digital pulses of varying periods. A discussion of how the output of a monostable vibrator varies with a change in RC time constant can be found in U.S. Pat. No. 4,464,622 to Franklin beginning at column 2 line 42.

The digital output pulses of the first monostable vibrator 20 and the inverted output of second monostable vibrator 21 are fed into the inputs of a NOR gate 22. The output of the NOR gate 22 is voltage spikes that vary in height, amplitude, with the difference between the RC time constants of the two RC circuits. A capacitor 23 at the output of the NOR gate 22 integrates the voltage spikes to give a detection signal relative to the difference between the RC time constant of the two RC circuits. The detection signal is amplified by a non-inverting amplifier 24. The gain of amplifier 24 can be adjusted by variable resistor 29.

The output of the amplifier 24 is compared with a reference setpoint by a comparator 25. The reference setpoint for comparator 25 is provided by a voltage divider network comprising resistors 144, 44, 38, 39, 40, and 41. The output signal of the comparator 25 is input to the controller 46. Depending on the output level of comparator 25 the microcontroller 46 illuminates indicator LEDs 9 for each proximity stage.

The change in stray capacitance caused by an object behind the wall lining is related to the thickness of the wall lining. To account for wall thickness the sensitivity of the stud sensor is adjusted to make the detector circuit 53 more, or less, sensitive to changes in stray capacitance of the capacitor plates 48, 49 and 49'. Standard wall lining thicknesses are ½-inch, ⅝-inch ¾-inch, 1-inch, 5/4-inch, 3/2-inch, and 2-inches.

Sensitivity of the device can be adjusted to either changing the gain of amplifier 24, via variable resistor 29, or by changing the reference setpoint of comparator 25. For thicker wall linings sensitivity is increased by increasing the gain of amplifier 24 or by lowering the reference setpoint for comparator 25. For thinner wall linings the sensitivity is decreased by decreasing the gain of amplifier 24 or by raising the reference setpoint for comparator 25.

In the preferred embodiment variable resistor 29 is set at the factory. The controller 46 is provided with a database or look-up table containing comparator setpoint values for each of the standard wall lining thicknesses of ½-inch, ⅝-inch ¾-inch, 1-inch, 5/4-inch, 3/2-inch, and 2-inches. At power-up the controller 46 sets a reference setpoint for comparator 25 to the value for the minimum wall thickness of ½-inch. After calibration a user can push button 8 to select a required sensitivity of the device depending on wall lining thickness. At each push of button 8 the controller sets the reference setpoint value for the next thicker wall lining. When 2-inches is reached the controller loops back to the reference setpoint value for ½-inch.

The controller sets the reference setpoint value by grounding selected ones of resistors 38, 39, 40, and 41 to change the ratio of the voltage divider network. The database or look-up table can contain information relating resistors to be grounded to reference setpoint values.

Figure 4:
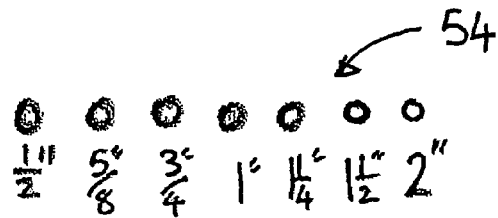
FIG. 4 illustrates an LED display for the device
Figure 5:
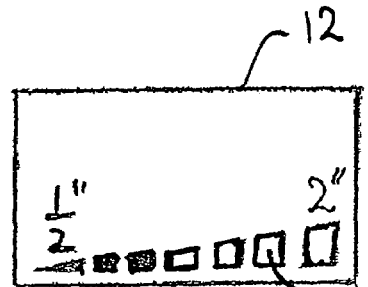
FIG. 5 illustrates an LCD display for the device.

The controller 46 has outputs for LEDs 54 and an LCD driver 37 and display 12. FIGS. 4 and 5 show two schemes for indicating on the display 2 which sensitivity setting has been selected. In the preferred embodiment of FIG. 4 a series of LEDs 54 are used. The LED corresponding to the selected sensitivity is illuminated. The alternative embodiment of FIG. 5 utilises a horizontal bar 55 on LCD display 12.

Figure 6:
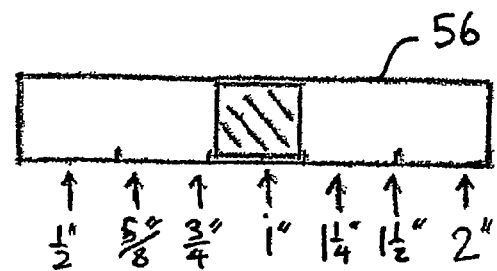
FIG. 6 is a second embodiment of the input device.

Referring to FIG. 6, in a second embodiment of the invention the push button 8 is replaced with a slide switch 56 having 7 positions corresponding to the wall lining thicknesses of ½-inch, ⅝-inch ¾-inch, 1-inch, 5/4-inch, 3/2-inch, and 2-inches. The slide switch 56 is connected to controller 46 for selecting the required reference setpoint value.

Figure 8:
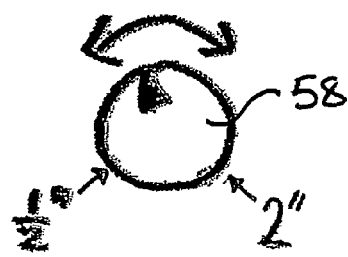
FIG. 8 is a forth embodiment of the input device.
Figure 7:
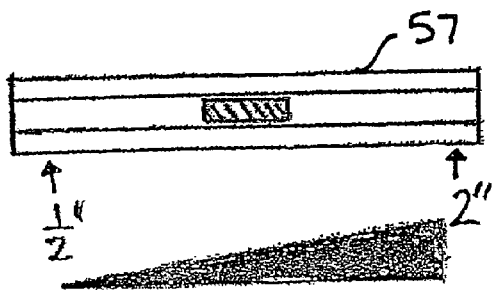
FIG. 7 is a third embodiment of the input device.

Referring to FIGS. 7 and 8, in third and forth embodiments of the invention the push button 8 is replaced with a user adjustable continuously-variable linear potentiometer 57 or a rotary potentiometer 58 respectively. The user can select a sensitivity setting by sliding, or tuning, the potentiometer.

A potentiometer provides a continuous change in resistance, which corresponds to an infinite number of sensitivity settings. The controller is provided with a larger database or look-up table having a finer range of reference setpoint values. In combination with a greater number of voltage divider resistors it provides much finer selection of sensitivity values between the standard wall lining thicknesses. Its advantage over a fixed number of choices of sensitivity is the provision of a flexible means for user definition of the desired sensitivity for locating studs.

Alternatively, the potentiometer could replace resistor 29 allowing the user to directly adjust the gain of amplifier 24.

Figure 9:
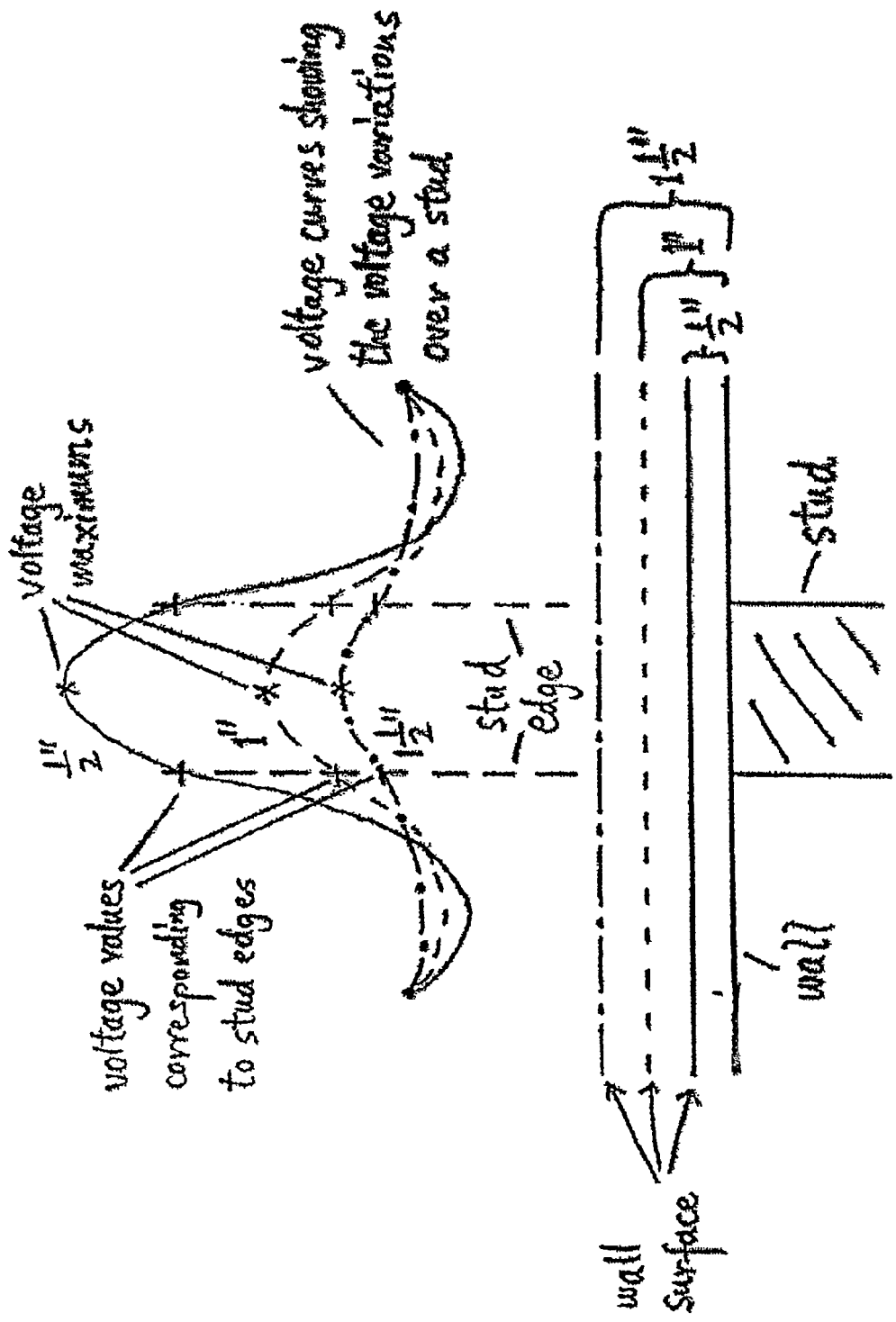
FIG. 9 illustrates a relationship between a wall lining thickness and a detection circuit parameter, such as voltage.

The relationship between maximum voltage output amplifier 24 and wall lining thickness is illustrated by FIG. 9. Different wall thickness results in a different maximum output voltage signal from the detection circuit 53. The thicker the wall lining the less the voltage maximum. If the controller 46 is provided with a database containing information about the relationship between the wall thickness, the voltage maximum and the voltage values when the device is located at stud edges, the device is capable of eliminating or greatly reducing the effect of wall thickness on the accuracy of locating stud edges.

In a fifth embodiment of the invention, the apparatus may include a process for detecting and automatically compensating for the effect of wall lining thickness on accuracy of locating studs. Firstly, the apparatus is self-calibrated on a wall. The device then goes through an auto sensitivity selection step. This step is undertaken with the comparator reference setpoint set at the value for the minimum ½-inch wall thickness. During this step the user moves the apparatus over the wall surface. The controller observes detection signal changes relating to changes in dielectric constant due to the presence of objects, e.g. studs, behind the wall lining. It does this by setting various comparator reference setpoints and observing the comparator signal output. Data linking a plurality of voltage maximums of the detection signals with comparator reference setpoint values is stored in a database or look-up table in controller 46. The controller selects and sets a new value for the comparator reference setpoint in response to the value of the maximum voltage of detection signal.

The advantage of the self-adjusting process is that it does not require the user to have prior knowledge of the wall lining thickness. It automatically adjusts to an appropriate sensitivity to locate the stud edges.

Figure 10:
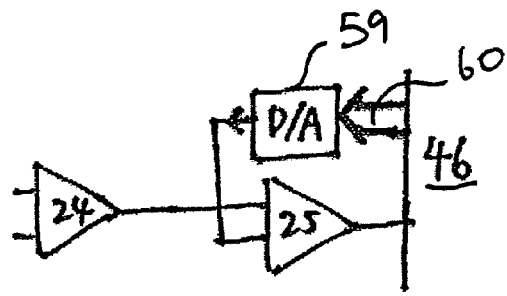
FIG. 10 illustrates an alternative method of providing a setpoint reference in the circuit of FIG. 3.

FIG. 10 illustrates an alternative method of providing a reference setpoint for the comparator 25. In the circuit of FIG. 3 the voltage divider network is replaced by a digital to analogue converter 59. The controller 46 is connected to the digital to analogue converter 59 and a controller output signal 60 is converted to an analogue voltage for the comparator 25.

Where in the foregoing description reference has been made to integers or elements having known equivalents then such are included as if individually set forth herein.

Embodiments of the invention have been described, however it is understood that variations, improvements or modifications can take place without departure from the spirit or scope of the invention.

What is claimed is:

1. A multiple sensitivity stud sensing device for determining location of an object behind a wall lining comprising:
   a housing having a surface for moving over a wall lining,
   a capacitive sensor having first and second capacitances located adjacent the surface,
   a detecting circuit connected to the sensor and providing a detection signal related to an imbalance between the first and second capacitances,
   a comparator having a reference signal and providing a comparator signal related to a difference between the detection signal and the reference signal,
   a controller receiving the comparator signal and providing a display signal,
   a display located on the housing and responsive to the display signal for indicating location of an object behind the wall lining, and
   an input device located on the housing and operable by a user of the device for selecting value of the reference signal.

2. The device of claim 1 wherein the input device comprises a seven position switch for selecting one of seven values of the reference signal.

3. The device of claim 1 wherein the value of the reference signal is indicated on the display.

4. The device of claim 1 wherein the input device comprises a push button connected to the controller, the controller responding to operation of the push-button by setting the value of the reference signal.

5. The device of claim 1 wherein the input device comprises a push button connected to the controller, the controller responding to operation of the push-button by setting the value of the reference signal, and the value of the reference signal is indicated on the display.

6. A multiple sensitivity stud sensing device for determining location of an object behind a wall lining comprising:
   a housing having a surface for moving over a wall lining,
   a capacitive sensor having first and second capacitances located adjacent the surface,
   a detecting circuit connected to the sensor and having an amplifier for providing a detection signal related to an imbalance between the first and second capacitances,
   a comparator having a reference signal and providing a comparator signal related to a difference between the detection signal and the reference signal,
   a controller receiving the comparator signal and providing a display signal,
   a display located on the housing and responsive to the display signal for indicating location of an object behind the wall lining, and
   an input device located on the housing and operable by a user of the device for selecting gain of the amplifier.

7. The device of claim 6 wherein the input device comprises a variable resistor connected to the amplifier.

* * * * *